United States Patent
Sjöström

(10) Patent No.: US 10,602,205 B2
(45) Date of Patent: Mar. 24, 2020

(54) NODE DISTRIBUTION IN A MULTI CHANNEL MOCA NETWORK

(71) Applicant: InCoax Networks AB, Gävle (SE)

(72) Inventor: Jonny Sjöström, Gävle (SE)

(73) Assignee: InCoax Networks AB, Gävle (SE)

( * ) Notice: Subject to any disclaimer, the term of this patent is extended or adjusted under 35 U.S.C. 154(b) by 0 days.

(21) Appl. No.: 15/423,262

(22) Filed: Feb. 2, 2017

(65) Prior Publication Data

US 2018/0167652 A1 Jun. 14, 2018

(30) Foreign Application Priority Data

Dec. 8, 2016 (EP) ..................................... 16202958

(51) Int. Cl.
*H04N 21/2385* (2011.01)
*H04L 12/28* (2006.01)
*H04N 21/61* (2011.01)
*H04W 16/14* (2009.01)

(52) U.S. Cl.
CPC ..... *H04N 21/2385* (2013.01); *H04L 12/2801* (2013.01); *H04L 12/2838* (2013.01); *H04L 12/2856* (2013.01); *H04N 21/6118* (2013.01); *H04N 21/6168* (2013.01); *H04L 2012/2849* (2013.01); *H04W 16/14* (2013.01)

(58) Field of Classification Search
None
See application file for complete search history.

(56) References Cited

U.S. PATENT DOCUMENTS

| 6,035,207 A | 3/2000 | Wang et al. |
| 8,085,802 B1 | 12/2011 | Monk et al. |
| 2013/0039221 A1 | 2/2013 | Lee et al. |
| 2017/0012894 A1* | 1/2017 | Ramesh .................. H04L 47/72 |

OTHER PUBLICATIONS

International Search Report and Written Opinion for related International Patent Application No. PCT/EP2017/082069 dated Jan. 26, 2018.
European Search Report for European Patent Application No. 16202958.1 dated Mar. 3, 2017.
G.hn: MoCA Specification; 08AB-121.

* cited by examiner

*Primary Examiner* — Omar S Parra
(74) *Attorney, Agent, or Firm* — Moore & Van Allen PLLC; Henry B. Ward, III

(57) ABSTRACT

MoCA network management device and a method for channel allocation to nodes over a coaxial cable in a MoCA network, comprising the steps of detecting a connection attempt from a first node on one channel out of a list of channels; and selectively allowing connection to said channel based on a likelihood parameter (R) which is dependent on which channel in the list of channels the connection attempt is made on. The list of channels may be a scan sequence of channels, wherein the likelihood parameter is dependent on position in of the channel in that scan sequence. If a node is denied access, it may switch to a next channel in the scan sequence.

16 Claims, 3 Drawing Sheets

| | F1 | F2 | F3 | F4 | | Fn |
|---|---|---|---|---|---|---|
| 1 | AR=1 | NA | | | | |
| 2 | AR=0,5 | AR=1 | NA | | • • | |
| 3 | AR=0,33 | AR=0,5 | AR=1 | NA | | |
| 4 | AR=0,25 | AR=0,33 | AR=0,5 | AR=1 | | |
| n | AR=1/(1+(n-1)) | AR=1/(1+(n-2)) | AR=1/(1+(n-3)) | AR=1/(1+(n-4)) | | AR=1 |

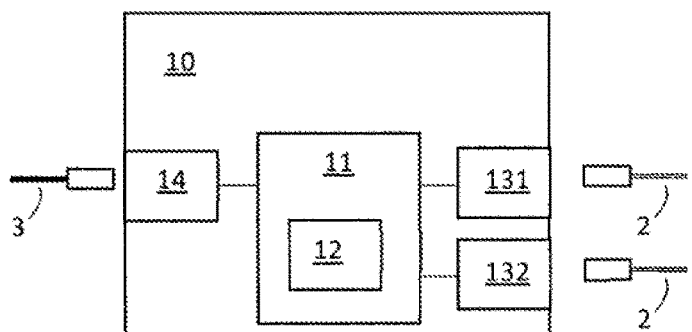
Fig. 3
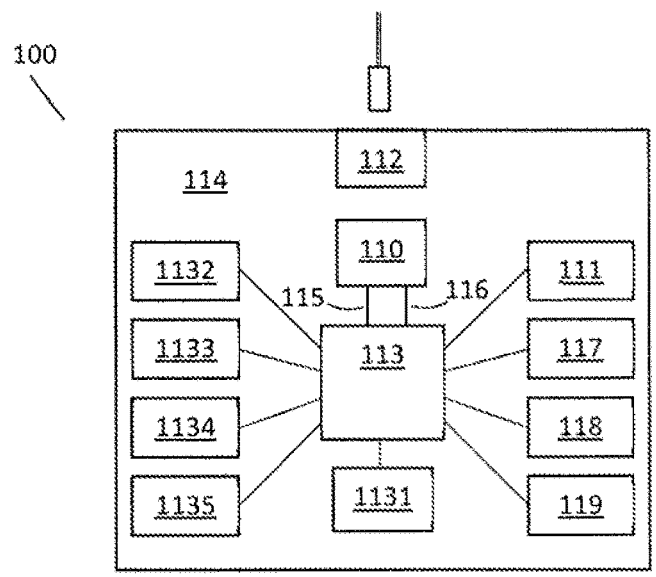
Fig. 4
| | F1 | F2 | F3 | F4 | | Fn |
|---|---|---|---|---|---|---|
| 1 | AR=1 | NA | | | | |
| 2 | AR=0,5 | AR=1 | NA | | | |
| 3 | AR=0,33 | AR=0,5 | AR=1 | NA | | |
| 4 | AR=0,25 | AR=0,33 | AR=0,5 | AR=1 | | |
| n | AR=1/(1+(n-1)) | AR=1/(1+(n-2)) | AR=1/(1+(n-3)) | AR=1/(1+(n-4)) | | AR=1 |
Fig. 5

NODE DISTRIBUTION IN A MULTI CHANNEL MOCA NETWORK

FIELD OF THE INVENTION

The present invention relates to a system for providing data communication over a coaxial network, and to methods for setting up such a system. More specifically, the invention relates to systems and methods for allocating channels to a plurality of nodes of a MoCA (Multimedia over Coaxial Alliance) network.

BACKGROUND

Since television became a commodity in homes, hotels, offices and other buildings, coaxial (coax in short) networks have regularly been implemented in such facilities. As a result, a large percentage of such facilities built in developed countries during at least the last 50 years are provided with such coaxial networks. Provision of signal access to a building has been accomplished in different ways throughout the years, from the early solution with a local antenna receiver to wired cable TV connection, and later optical fiber networks. Still, there is a need to distribute access within the building, for which the local coaxial network may be used.

Multimedia over Coaxial Alliance (MoCA) is an industry standard alliance developing technology for the connected home. MoCA technology runs over the existing in-home coaxial cabling, enabling whole-home distribution of digital content. MoCA provides the backbone for the home digital entertainment network, and supports streaming media such as standard television and allows linking a set-top box to a TV and other entertainment such as computers or game consoles in multiple rooms using existing wiring.

In a system as provided by the present applicant, data broadband access may be provided to a plurality of independent users over an existing coax infrastructure in multi-dwelling units, block of flats, hotels, holiday villages etc. In such a system, a central network management unit may be connected to the coaxial network of a building complex, and connected to external data channel 3, such as a supply data cable or an optical fiber. The network management device makes use of the previously un-used frequency spectrum above the regular TV spectrum in coaxial cables for data transportation. The network management device is configured to merge an incoming data stream from the external data channel and a TV signal, where applicable, into the same cable and to send it through the coaxial network. At the other end of the coaxial network, the signals are divided by a modem, operating under a MoCA specification. Since the data stream and TV-signal are using separate frequency spectrums, the TV signal is effectively isolated from the data stream.

SUMMARY

In such a MoCA system for providing independent data access to users in a building complex, different user nodes may be connected to different channels provided by the network management device on the same coaxial network. While a number of nodes may share a common channel, e.g. by communication in different timeslots, it is nevertheless desirable to suitably distribute nodes over different channels. Solutions targeting this general object are presented herein.

According to a first aspect, a method is provided for channel allocation to nodes over a coaxial cable in a MoCA network, comprising the steps of:

detecting a connection attempt from a first node on one channel out of a list of channels;

selectively allowing connection to said channel based on a likelihood parameter which is dependent on which channel in the list of channels the connection attempt is made on.

In one embodiment the list of channels is a scan sequence of channels, wherein the likelihood parameter is dependent on position in of the channel in that scan sequence.

In one embodiment the likelihood for allowing connection is increasingly higher from a first to a last position in the scan sequence.

In one embodiment the likelihood parameter is an accept ratio R, and wherein the step of selectively allowing connection comprises evaluating a relation of a random number N with respect to the accept ratio R.

In one embodiment the step of evaluating comprises the steps of

Determining a random number N between 1 and 1/R, and allowing connection if T=1.

In one embodiment said list is a scan sequence of 1-n channel frequencies, in which a first frequency has a lowest likelihood and a last frequency has a highest likelihood.

In one embodiment the accept ration R is 1/n for the first channel frequency and 1 for the last channel frequency.

In one embodiment the accept ratio is $R=1/(1+(n-s))$, where s is the position of said channel frequency in the scan sequence of channel frequencies.

In one embodiment the method comprises the steps of
denying connection to the channel, and
subsequently detecting a second connection attempt from the first node on a different channel from said list.

In one embodiment said different channel is a next channel in a scan sequence of the list of channels, which next channel is associated with a likelihood parameter based on which connection is allowed with higher likelihood than said one channel.

According to a second aspect, a network management device is provided for controlling connection to a node over a coaxial cable in a MoCA network, comprising a data network connector to an external data network, a coax connector, a network controller, and a memory comprising computer code which is executable by the controller to detect a connection attempt from a first node on one channel from a list of channels; and to selectively allow connection to said channel based on a likelihood parameter which is dependent on which channel in the list of frequencies the connection attempt is made on.

In one embodiment the network management device comprises a plurality of network controllers, each selectively allowing or denying connection to different channels within the list of channels based on a likelihood parameter dependent on the respective channel.

In one embodiment the memory comprises computer code which is executable by the controller to carry out any of the method steps above.

According to a third aspect a MoCA node configured to connect to such a management device over a coaxial cable in a MoCA network, comprising a coax connector, a signal transceiver, a control unit and a memory comprising computer code which is executable by the control unit to control the signal transceiver to transmit a connection attempt on one channel from a list of channels and, responsive to receiving a deny message transmit a subsequent connection attempt on a different channel in that list for which the likelihood of connection is higher.

In one embodiment the control unit is configured to control the signal transceiver to swap to a higher frequency channel in a scan sequence of said list of channels.

BRIEF DESCRIPTION OF THE DRAWINGS

Embodiments are described below with reference to the accompanying drawings, in which:

FIG. 3 schematically illustrates a network management device for use in a system for providing data communication over a MoCA network;

FIG. 4 schematically illustrates a MoCA node, such as a modem or network adapter;

FIG. 5 schematically illustrates a scheme for setting a likelihood for different network setups including different number of MoCA network channels according to various embodiments.

DETAILED DESCRIPTION

The invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected" to another element, it can be directly connected to the other element or intervening elements may be present. In contrast, when an element is referred to as being "directly connected" to another element, there are no intervening elements present. Like numbers refer to like elements throughout. It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Well-known functions or constructions may not be described in detail for brevity and/or clarity. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Embodiments of the invention are described herein with reference to schematic illustrations of idealized embodiments of the invention. As such, variations from the shapes and relative sizes of the illustrations as a result, for example, of manufacturing techniques and/or tolerances, are to be expected. Thus, embodiments of the invention should not be construed as limited to the particular shapes and relative sizes of regions illustrated herein but are to include deviations in shapes and/or relative sizes that result, for example, from different operational constraints and/or from manufacturing constraints. Thus, the elements illustrated in the figures are schematic in nature and their shapes are not intended to illustrate the actual shape of a region of a device and are not intended to limit the scope of the invention.

Figure 1:
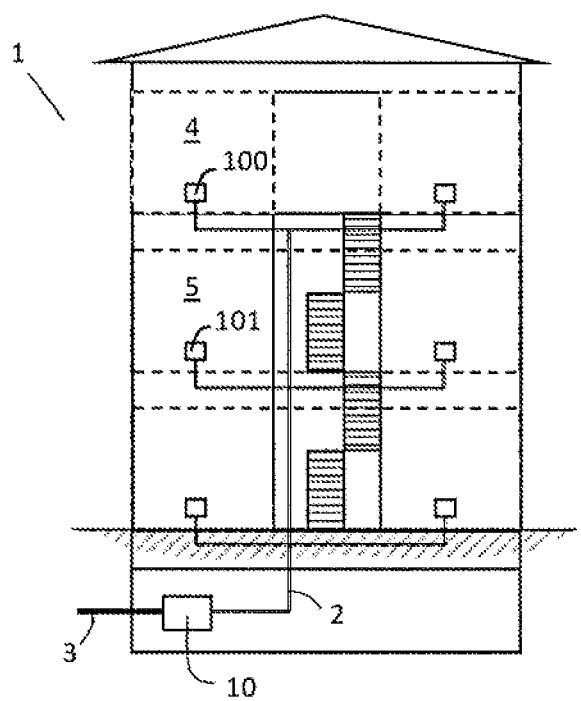
FIG. 1 schematically illustrates deployment of a system for providing data communication over a MoCA network in a construction complex.

FIG. 1 illustrates, by way of example, a construction complex 1 in the form of a single building. For the sake of completeness, it may be noted that the invention as described herein may be employed in a construction complex comprising a plurality of buildings having a common coaxial network, or interconnected coaxial networks. The construction complex 1 may e.g. be a block of apartments or a hotel. In the construction complex, a number of separate building units, such as apartments, hotel rooms, offices etc. are indicated by means of dashed lines. A coaxial network 2 is provided in the construction complex 1, having sockets in all or a plurality of the different building units, such as building units 4 and 5. Both apartment buildings and hotels normally have a coaxial network covering all apartments or hotel rooms for TV signal distribution. These cables can also be used for high speed Internet access, IPTV, VoIP, Web-TV services etc. without affecting the TV signal quality. In the proposed solution, a network management unit 10 is connected to the coaxial network 2, and connected to external data channel 3, such as a supply data cable or an optical fiber. The network management device 10 may e.g. be installed in a basement, as illustrated, or on a loft of the building 1, and may be connected after a TV amplifier. The network management device 10 makes use of the previously un-used frequency spectrum above the regular TV spectrum (5-790 MHz) in coaxial cables for data transportation. The network management device 10 is configured to merge an incoming data stream from the external data channel 3 and a TV-signal, where applicable, into the same cable and to send it through the coaxial network 2. At the other end of the coaxial network 2, the signals are divided by a node 100, 101, such as an access modem, operating under a MoCA specification. Since the data stream and TV-signal are using separate frequency spectrums, the TV signal is effectively isolated from the data stream. Operation of the disclosed system may be carried out as explained in applicant's patent application EP16178618.

Figure 2:
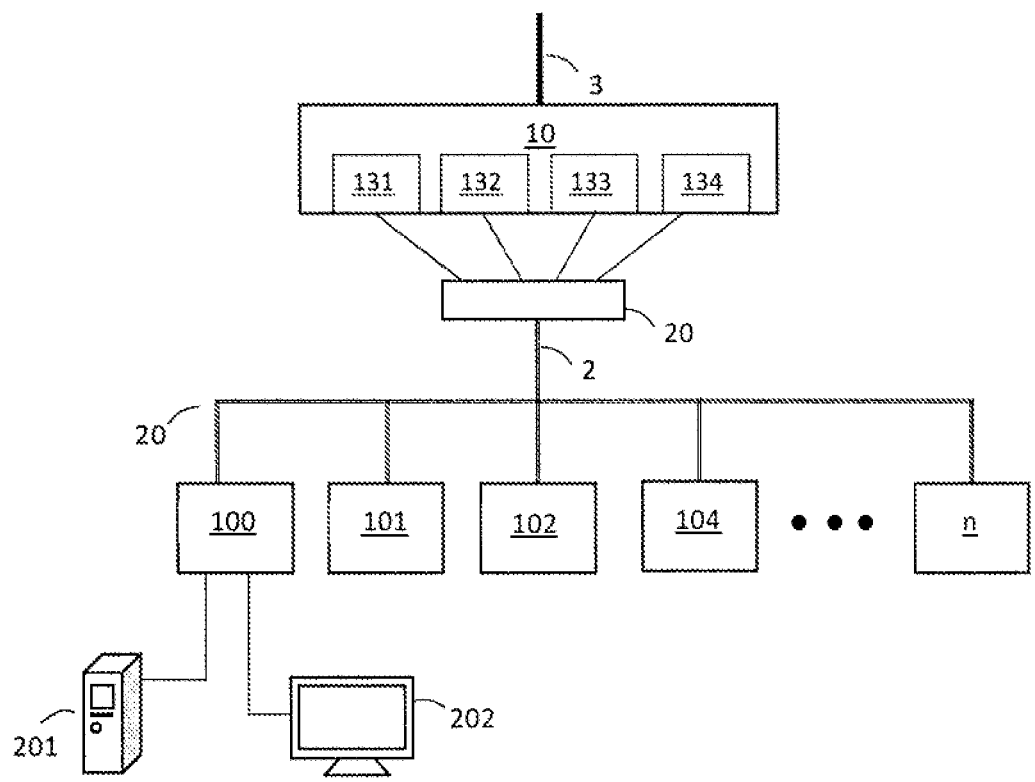
FIG. 2 schematically illustrates a principle view of a system according to FIG. 1 according to an embodiment.

FIG. 2 illustrates the basic architectural structure of a system according to one embodiment, where the network management device 10 is shown at the top, connected between an external data channel 3 and a coaxial network 2. A plurality of MoCA nodes 100-n are connected to the coaxial network 2, operable to obtain access to the external data channel 3 through the network management device 10. As an example, a MoCA node 100 may receive television signals over the coaxial network 2 for output on a connected TV set 202, which may include or be connected through a set top box (not shown). In addition, the MoCA node 100 may be configured to provide network access to a connected computer 201, usable for receiving multimedia data. The MoCA node 100 may further comprise a wireless access point, for radio access to the MoCA node 100 from various portable radio communication devices such as computers, mobile phones, tablets etc.

In one embodiment, the management device 10 includes a plurality of ports 131-134, which each may be configured to handle data traffic and communication to a plurality of nodes. Each port may support communication on one channel, such as one frequency channel, which may include a number of sub channels for accessing different nodes. As an example, each port may provide the possibility of accessing a plurality of nodes on different sub channels, which may be allocated different time slots on the port frequency, by the management device 10. Since all channels are logically orthogonal by means of frequency and possible time, signals to the different ports 131-134 may be merged on a common coaxial cable 2, e.g. by means of a diplexer 20.

FIG. 3 schematically illustrates the management device 10 in one embodiment, comprising a connector 14 for connection to an external data channel 3, such as an optical fiber or other physical carrier of broadband data. At the other end of the network management device 10, two ports 131 and 132 are provided for connection to a coaxial network 2. As discussed with reference to FIG. 2, more than two ports may be included, and they may be configured to be connected to the coaxial cable over a diplexer. A control unit 11 is provided in the network management device 10, inter alia for controlling communication with MoCA nodes connected to the coaxial network 2. For this purpose, the control unit 11 includes MoCA chip 12. A MoCA chip is the hardware chip implementing the MoCA protocol and the HW required for fulfilling the MoCA specification, and such chips are available on the market. Hardware content in the MoCA chip typically includes baseband radio/power amplifier & Low noise amplifier, mixers, RF-switches, microprocessor, clock circuitry and an Ethernet packet bus of some type. MoCA chip makers apply the MoCA specification to the chip design by selection of chip content required to fulfill specification. This may vary depending on MoCA Specification version, of which currently versions 1.0, 1.1, 2.0, 2.5 exist.

In the network management device, the control unit 11 is operated to control a MoCA chip in the connected MoCA nodes 100, and to access devices connected to the MoCA chip in such MoCA nodes 100. In FIG. 3 one control unit 11 is indicated, but in an alternative embodiment there may be separate network controllers 11 serving each one channel. Different network controllers 11 operating on the same coaxial network 2 preferably operate on different channel frequencies, and may that be unaware of each other. Indeed, such different network controllers 11 may be contained in different network management devices 10, connected to the same coaxial network 2.

In the network management device 10, CATV and MoCA channels may be combined in a combiner (not shown) which is a frequency band selective device. The combiner may combine several MoCA channels and several CATV channels to be distributed to the same coaxial network 2. A network management device 10 may have several MoCA channels of different frequencies connected to a combiner and distributed to the coaxial network 2. The CATV signals may be origin from a satellite system, terrestrial TV system, fiber optical CATV distribution network or another source of CATV.

FIG. 4 schematically illustrates a MoCA node 100, such as an MoCA modem or network adapter. Such a MoCA node 100 includes a plurality of components, connected to one or more PCBs 114, held in a case (not shown). A connector 112 is provided for connection to a coaxial network 2. The coax connector 112 is connected to a MoCA chip 110. The MoCA chip, in turn, is connected with a management data clock (MDC)/management data input/output (MDIO) interfaces 115 and an Ethernet bus 116 from General-purpose input/output (GPIO) to a host device 113. The host device 113 may be connected with one or more of a Double Data Rate (DDR) memory 1131, host clock circuitry 1132, a boot memory 1133, an operating system memory 1134, and a power supply 1135 for host components and filters. The host device 113 may be a master and the MoCA device 110 may be a slave. The host device, typically a microprocessor or microcontroller, translates data communication from the MoCA device to all other connected hardware devices, such as indicated devices 111, 117-120, which may include a memory 117 connected by a Serial Peripheral Interface (SPI), LED control 118 connected by GPIO, sensors 119 connected through an I2C interface, an Ethernet switch 111 connected through an Ethernet bus, and a Wi-Fi access point (not shown). In an alternative embodiment, a MoCA node as described with reference to FIG. 5 in EP16178618 may be configured to carry out method steps as described herein.

According to an aspect of the invention, a solution is implemented as a part of a decision process executed in the network controller 11, whether to reject or allow a new MoCA node 100, such as a MoCA modem, on the network. The solution is based on the principle that the MoCA nodes are configured to automatically change channel and try to connect again, if rejected. When rejected, a MoCA node is configured to keep trying to connect by scanning predefined MoCA channels, e.g. in a round robin fashion, until it succeeds. The scan sequence of channels that the nodes tries to connect to is preferably fixed and the same for all nodes.

In a preferred embodiment, a network controller 11 configured to allocate access to one channel operates according to a likelihood rule which is dependent on the channel it uses, for determining to allow or deny a node to connect to the MoCA network. By allowing nodes to access the network with a comparatively lower likelihood for earlier channels in the scan sequence than in subsequent channels, this has the beneficial effect of resulting in a balanced distribution of nodes among the channels. This will be explained further by means of examples below.

In one embodiment, a method is provided for channel allocation to nodes 100, such as modems, over a coaxial cable 2 in a MoCA network. The method may comprise the step of detecting a connection attempt from a first node 100 on one channel out of a list of channels. This may be detected in a network management device 10, e.g. in a controller 11 of the device 10. As an example, the list of channels may comprise 4 different channels, e.g. 4 different frequency channels of different frequency level. The network management device 10 may be capable of allowing access to the MoCA network on the channel on which the connection attempt is received if it supports access to that channel, but it may also take into consideration that there are available resources on that channel, such as available sub channels, e.g. time slots, within the frequency of that channel. Furthermore, the network management device is preferably configured to selectively allow connection to the channel based on a likelihood parameter which is dependent on which channel in the list of channels the connection attempt is made on.

In one embodiment, the list of channels is an ordered list, wherein the likelihood parameter is dependent on position of the channel in that ordered list. The likelihood for allowing connection may then be increasingly higher from a first to a last position in the ordered list. A node 100 which is connected to the coaxial network 2 may be configured to attempt to connect to the MoCA network operated by the network management device 10. This may occur as a default rule when the node 100 is powered and connected to the coaxial network, and has no previous channel allocated to it. Alternatively, it may be possible to execute a channel access process, in which the node is triggered to search for an available channel on the MoCA network. The node or node 100 is preferably configured to attempt to connect to the MoCA network using the known scan sequence, attempting one channel at a time in the list of frequencies until it succeeds. In a preferred embodiment, the node 100 is configured to always start with the same channel, such as the channel with the lowest or the highest frequency, and then proceed to the next higher, or lower, frequency channel if access is denied. In one embodiment, the node 100 may be preconfigured to start attempting a predetermined channel as a default setting. In such an embodiment, such nodes may thus be given a higher chance to be given access to that predetermined starting channel, which may be beneficial in a system where a certain type of nodes 100 preferably are allocated a certain channel.

In one embodiment, a parameter operating as an Accept Ratio (R) is introduced and used in the decision process, e.g. as executed by the network controller 11, whether to reject or allow a new MoCa node on the network. This parameter controls the likelihood that a new node's attempt to connect to the network will be accepted, if not rejected for other reasons as explained above. In one embodiment, all attempts will be accepted if R is set to 1, whereas 50% of the attempts will be accepted if set to 0.5.

In one embodiment the likelihood parameter, such as R, may be set such that a first channel in scan order has a lowest value, and that each successive channel in the scan order has a higher likelihood parameter value than the preceding channel. In one embodiment, the last channel in the scan order is 100%. The scan order may be an order of channels, e.g. frequency channels, selected from a list of channels. The scan sequence may be carried out in a magnitude order of frequencies of the list of frequencies, e.g. starting from the lowest to the highest frequency, or from the highest to the lowest. Alternatively, the scan sequence may be non-linear, and comprise an order of channels which does not represent a magnitude order of the channel frequencies. When an end of a scan sequence is reached, a node may be configured to swap back to a first channel of the scan sequence and start over.

FIG. 5 illustrates an example of R setting for a network setup. In such a network embodiment, each node has a common scan sequence for a predetermined list of channels (CH) 1-n, which is CH1 to CH2 to CH3 to CH4 to . . . CHn, and then back to CH1. In this example, each channel represents one channel frequency F, or frequency band. The frequency scan sequence is thus F1->F2->F3->F4 . . . ->Fn (->F1). For each channel, a network controller 11 configured to operate one channel may be configured to accept a node onto the network, responsive to a connection attempt on said one channel, with a likelihood based on which channel that is. In the table of FIG. 5, each row initially indicates the number of channels on the network, which may be managed by one or more network management devices 10. For each one of those channels (indicated by its channel frequency F) the R is indicated. In this embodiment, the last channel of the scan sequence always has R=1, i.e. representing 100%. In alternative embodiments, the last channel in the scan sequence may have R<1. represents its channel, In one embodiment, configured to obtain even distribution of MoCA nodes 100, 101 over all available channels CH1-CHn, R can be calculated as:

$R=1/(1+(n-s))$, where

R=Accept Ratio for the channel [0-1]
n=Number of available channels [1-n]
s=The channels position (i.e. in place of order) in the scan sequence [1-n].

Figure 6:
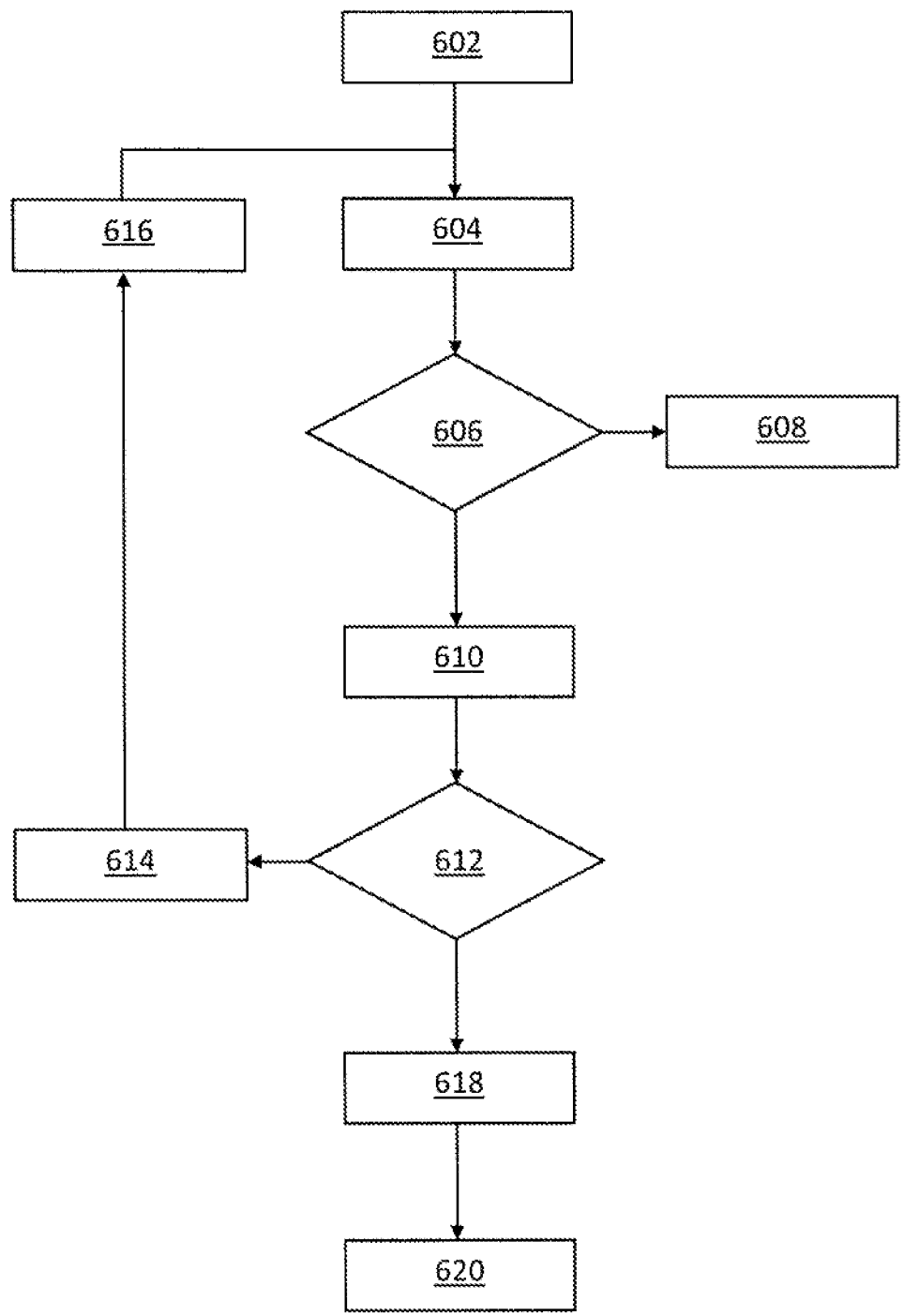
FIG. 6 illustrates a flow chart for selectively accepting or denying a node to a channel on a MoCA network.

FIG. 6 illustrates, by way of example, a flow chart for a method for channel allocation to nodes over a coaxial cable in a MoCA network according to various embodiments.

In step 602, a node 100 capable to operate as a MoCA network node, e.g. a modem, starts to attempt to connect to a MoCA network over a coax cable. This is carried out by using a predetermined scan sequence, and preferably also starting with a predetermined starting channel of that scan sequence.

In step 604, the node attempts to connect on a channel CHx, which at the first attempt may be CH1, of a scan sequence from CH1 to CHn.

In step 606, which is optional, it is determined whether the node in question is already known to the MoCA network, and has already been allocated access to the channel in question.

Step 608 succeeds step 606 if the node was known, wherein the node is handled as known and allowed back onto the channel.

Step 610 succeeds step 606, or step 604 if step 606 is not included, and involves the step of determining a likelihood parameter for allowing the node to gain access to the channel. This may e.g. be obtained by randomly or pseudo-randomly pulling a number N between 1 and 1/R. For a channel having an accept ration R of 1/3, this means randomly selecting the number 1, 2 or 3.

In step 612, a determination is made whether to deny or accept. In one embodiment, a decision to accept may be taken if the theoretic likelihood is realized. As an example, the network controller moves to accept the node if N=1.

In step 618 the node is allocated access to the channel and added to a memory connected to the network controller as known.

In step 620, an "Accept" message is sent to the node.

In step 612, a decision to deny may instead be taken if the theoretic likelihood is not realized. In the given example, the network controller moves to deny the node if N=2 or 3.

In step 614, a "Deny" message is sent to the node, if the controller has taken a decision to deny access.

In step 616, a node that has received a deny message will switch to a next channel CH(x+1) in the scan sequence and attempts to connect on that channel.

The description given above relates to various general and specific embodiments, but the scope of the invention is limited only by the appended claims.

The invention claimed is:

1. A method for channel allocation to nodes over a coaxial cable in a data communication network, comprising the steps of:
   detecting a connection attempt from a first node on one available channel out of a list of channels, wherein the list of channels is a scan sequence of channels; and
   selectively allowing connection of the first node to said one channel based on a likelihood parameter, which is dependent on position of said one channel in said scan sequence, wherein a likelihood for allowing connection is increasingly higher from a first to a last position in the scan sequence.

2. The method of claim 1, wherein the likelihood parameter is an accept ratio R, and wherein the step of selectively allowing connection comprises evaluating a relation of a random number N with respect to the accept ratio R.

3. The method of claim 2, further comprising the steps of:
denying connection of the first node to the channel; and
subsequently detecting a second connection attempt from the first node on a different channel from said list of channels.

4. The method of claim 2, wherein the step of evaluating comprises determining the random number N, which is between 1 and 1/R, and allowing connection if N=1.

5. The method of claim 4, further comprising the steps of:
denying connection of the first node to the channel; and
subsequently detecting a second connection attempt from the first node on a different channel from said list of channels.

6. The method of claim 2, wherein said list of channels is a scan sequence of 1–n channel frequencies, where n is a number of channel frequencies, wherein a first frequency has a lowest likelihood for allowing connection and a last frequency has a highest likelihood for allowing connection.

7. The method of claim 6, wherein the accept ratio R is 1/n for a first channel frequency and wherein the accept ratio R is 1 for a last channel frequency.

8. The method of claim 6, wherein the accept ratio is R=1/(1+(n−s)), where s is a position of said channel frequency in the scan sequence of channel frequencies.

9. The method of claim 1, further comprising the steps of:
denying connection of the first node to the channel; and
subsequently detecting a second connection attempt from the first node on a different channel from said list of channels.

10. The method of claim 9, wherein the likelihood parameter is an accept ratio R, and wherein the step of selectively allowing connection comprises evaluating a relation of a random number N with respect to the accept ratio R.

11. The method of claim 9, wherein said different channel is a next channel in a scan sequence of the list of channels, which next channel is associated with a likelihood parameter that is based on which connection is allowed with higher likelihood than said one channel.

12. A network management device for controlling connection to a node over a coaxial cable in a data communication network, comprising:
a data network connector connected to an external data network;
a coax connector;
a network controller; and
non-transitory computer readable memory comprising computer code which is executable by the network controller to:
detect a connection attempt from a first node on one channel from a list of channels, wherein the list of channels is a scan sequence of channels, and
selectively allow connection of the first node to said channel based on a likelihood parameter, which is dependent on position of said one channel in said scan sequence, wherein a likelihood for allowing connection is increasingly higher from a first to a last position in the scan sequence.

13. The network management device of claim 12, further comprising a plurality of network controllers, each network controller comprising non-transitory computer readable memory comprising computer code which is executable by the network controller to selectively allow or deny connection to a different channel within the list of channels based on a likelihood parameter dependent on the respective channel.

14. The network management device of claim 12, wherein the non-transitory computer readable memory comprises computer code that is executable by the network controller to evaluate a relation of a random number N with respect to the accept ratio R.

15. A data communication node configured to connect to a management device for controlling connection to a node over a coaxial cable in a data communication network, comprising:
a coax connector;
a signal transceiver;
a control unit; and
non-transitory computer readable memory comprising computer code which is executable by the control unit to control the signal transceiver to:
transmit a connection attempt of the node on one channel out of a list of channels, and
transmit a second connection attempt on a different channel out of the list of channels, wherein in the list of channels a likelihood of allowing connection is increasingly higher from a first to a last position in the scan sequence.

16. The data communication node of claim 15, wherein the control unit is configured to control the signal transceiver to swap to a higher frequency channel in a scan sequence of said list of channels.

* * * * *